US008810626B2

(12) United States Patent
Putraya et al.

(10) Patent No.: US 8,810,626 B2
(45) Date of Patent: Aug. 19, 2014

(54) METHOD, APPARATUS AND COMPUTER PROGRAM PRODUCT FOR GENERATING PANORAMA IMAGES

(75) Inventors: Gururaj Putraya, Bangalore (IN); Pranav Mishra, Bangalore (IN); Toka Veeranjaneyalu, Bangalore (IN); Krishna Annasagar Govindarao, Bangalore (IN)

(73) Assignee: Nokia Corporation, Espoo (FI)

( * ) Notice: Subject to any disclaimer, the term of this patent is extended or adjusted under 35 U.S.C. 154(b) by 774 days.

(21) Appl. No.: 12/973,212

(22) Filed: Dec. 20, 2010

(65) Prior Publication Data

US 2012/0154520 A1   Jun. 21, 2012

(51) Int. Cl.
*H04N 5/262* (2006.01)
*H04N 5/349* (2011.01)
*G06T 3/40* (2006.01)
*H04N 1/387* (2006.01)
*H04N 5/232* (2006.01)

(52) U.S. Cl.
CPC ............ *H04N 1/3876* (2013.01); *G06T 3/4038* (2013.01); *H04N 5/23238* (2013.01)
USPC .......................................................... 348/36

(58) Field of Classification Search
CPC ................................................. H04N 5/23238
USPC ..................................................... 348/36–39
See application file for complete search history.

(56) References Cited

U.S. PATENT DOCUMENTS

| | | | | |
|---|---|---|---|---|
| 7,260,258 B2* | 8/2007 | Foote et al. | .................... | 382/167 |
| 7,409,105 B2* | 8/2008 | Jin et al. | ......................... | 382/284 |
| 8,160,391 B1* | 4/2012 | Zhu et al. | ....................... | 382/284 |
| 2007/0081081 A1* | 4/2007 | Cheng | ......................... | 348/218.1 |
| 2009/0146961 A1* | 6/2009 | Cheung et al. | ................. | 345/172 |
| 2009/0285544 A1* | 11/2009 | Fitzgibbon et al. | ............. | 386/52 |
| 2010/0079808 A1* | 4/2010 | Mizutani | ...................... | 358/1.16 |
| 2010/0246976 A1* | 9/2010 | Tolstaya | ........................ | 382/218 |
| 2011/0122145 A1* | 5/2011 | Lepikhin | ....................... | 345/589 |
| 2011/0141226 A1* | 6/2011 | Stec et al. | ........................ | 348/36 |
| 2011/0141229 A1* | 6/2011 | Stec et al. | ........................ | 348/37 |

* cited by examiner

*Primary Examiner* — Sath V Perungavoor
*Assistant Examiner* — Matthew J Anderson
(74) *Attorney, Agent, or Firm* — Alston & Bird LLP (57) ABSTRACT

In accordance with an example embodiment a method and apparatus is provided. The method comprises receiving an image and a subsequent image having an overlapping region in a storage. The overlapping region comprises a first and a second overlapping region. A substantial portion of the second overlapping region in the subsequent image may be blended with a substantial portion of a non-overlapping region of the subsequent image, and then modified in the image based on the substantial portion of the blended second overlapping region in the subsequent image. A portion of the panorama image may be generated by combining the modified substantial portion of the second overlapping region with the substantial portion of the non-overlapping region of the image. The modified substantial portion of the second overlapping region and the substantial portion of the non-overlapping region of the image may be removed from the storage.

23 Claims, 6 Drawing Sheets

FIGURE 5

METHOD, APPARATUS AND COMPUTER PROGRAM PRODUCT FOR GENERATING PANORAMA IMAGES

TECHNICAL FIELD

Various implementations relate generally to method, apparatus, and computer program product for generating panorama images.

BACKGROUND

Panorama image refers to an image captured with an extended field of view in one or more directions (for example, horizontally or vertically). The extended field of view is a wide-angle representation beyond that captured by an image sensor. For example, an image that presents a field of view approaching or greater than that of the human eye can be termed as a panorama image. Various devices like mobile phones and personal digital assistants (PDA) are now being increasingly configured with panorama image/video capture tools, such as a camera, thereby facilitating easy capture of the panorama images/videos.

Typically, a panorama image may be constructed by capturing a sequence of images such that a pair of adjacent images may have portions that are common between them. For example, the edge portions may be common between the pair of the adjacent images. While forming the panorama image of the captured images, such common portions (hereinafter referred to as overlapping regions) are processed and blended so that a smooth panorama image may be obtained. Typically, while generating the panorama image using a complex blending technique, a huge panorama buffer is allocated, where the individual images are stored directly after being processed.

SUMMARY OF SOME EMBODIMENTS

Various aspects of examples of the invention are set out in the claims.

In a first aspect, there is provided a method comprising: receiving an image and at least one subsequent image in a storage, the image and the at least one subsequent image comprising at least one overlapping region, the at least one overlapping region being separated into a first overlapping region and a second overlapping region; blending a substantial portion of the second overlapping region of the at least one subsequent image with a substantial portion of a non-overlapping region of the at least one subsequent image; modifying the substantial portion of the second overlapping region of the image based on the blended second overlapping region of the at least one subsequent image; generating at least one portion of a panorama image by combining the substantial portion of the modified second overlapping region of the image with a substantial portion of a non-overlapping region of the image; and removing the modified substantial portion of the second overlapping region and the substantial portion of the non-overlapping region of the image from the storage upon generating the at least one portion of the panorama image.

In a second aspect, there is provided an apparatus comprising: at least one processor; and at least one memory comprising computer program code, the at least one memory and the computer program code configured to, with the at least one processor, cause the apparatus at least to perform: receiving an image and at least one subsequent image in a storage, the image and the at least one subsequent image comprising at least one overlapping region, the at least one overlapping region being separated into a first overlapping region and a second overlapping region; blending a substantial portion of the second overlapping region of the at least one subsequent image with a non-overlapping region of the at least one subsequent image; modifying the substantial portion of the second overlapping region of the image based on the blended second overlapping region of the at least one subsequent image; generating at least a portion of a panorama image by combining the substantial portion of the modified second overlapping region of the image with a substantial portion of a non-overlapping region of the image; and removing the modified substantial portion of the second overlapping region and the non-overlapping region of the image from the storage upon generating the at least one portion of the panorama image.

In a third aspect, there is provided a computer program product comprising at least one computer-readable storage medium, the computer-readable storage medium comprising a set of instructions, which, when executed by one or more processors, cause an apparatus to at least perform: receiving an image and at least one subsequent image in a storage, the image and the at least one subsequent image comprising at least one overlapping region, the at least one overlapping region being separated into a first overlapping region and a second overlapping region; blending a substantial portion of the second overlapping region of the substantial portion of the at least one subsequent image with a non-overlapping region of the at least one subsequent image; modifying the substantial portion of the second overlapping region of the image based on the blended second overlapping region of the at least one subsequent image; generating at least a portion of a panorama image by combining the substantial portion of the modified second overlapping region of the image with a substantial portion of a non-overlapping region of the image; and removing the modified substantial portion of the second overlapping region and the substantial portion of non-overlapping region of the image from the storage upon generating the at least one portion of the panorama image.

BRIEF DESCRIPTION OF THE FIGURES

For a more complete understanding of example embodiments of the present invention, reference is now made to the following descriptions taken in connection with the accompanying drawings in which.

DETAILED DESCRIPTION

Example embodiments and their potential effects are understood by referring to FIGS. 1 through 5 of the drawings.

Figure 1:
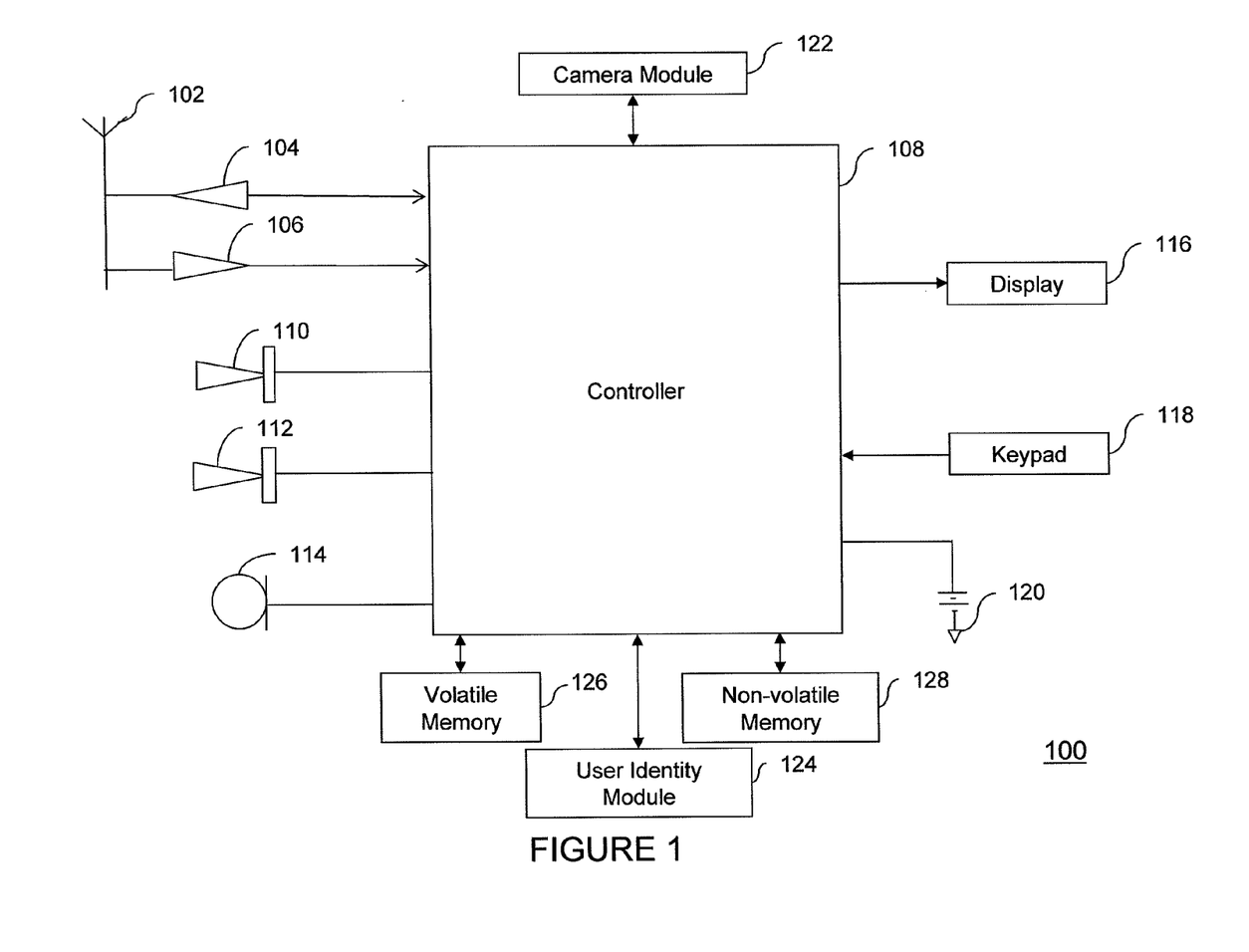
FIG. 1 illustrates a device in accordance with an example embodiment.

FIG. 1 illustrates a device 100 in accordance with an example embodiment. It should be understood, however, that the device 100 as illustrated and hereinafter described is merely illustrative of one type of device that may benefit from various embodiments, therefore, should not be taken to limit the scope of the embodiments. As such, it should be appreciated that at least some of the components described below in connection with the device 100 may be optional and thus in an example embodiment may include more, less or different components than those described in connection with the example embodiment of FIG. 1. The device 100 could be any of a number of types of mobile electronic devices, for example, portable digital assistants (PDAs), pagers, mobile televisions, gaming devices, cellular phones, all types of computers (for example, laptops, mobile computers or desktops), cameras, audio/video players, radios, global positioning system (GPS) devices, media players, mobile digital assistants, or any combination of the aforementioned, and other types of communications devices.

The device 100 may include an antenna 102 (or multiple antennas) in operable communication with a transmitter 104 and a receiver 106. The device 100 may further include an apparatus, such as a controller 108 or other processing device that provides signals to and receives signals from the transmitter 104 and receiver 106, respectively. The signals may include signaling information in accordance with the air interface standard of the applicable cellular system, and/or may also include data corresponding to user speech, received data and/or user generated data. In this regard, the device 100 may be capable of operating with one or more air interface standards, communication protocols, modulation types, and access types. By way of illustration, the device 100 may be capable of operating in accordance with any of a number of first, second, third and/or fourth-generation communication protocols or the like. For example, the device 100 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA1000, wideband CDMA (WCDMA) and time division-synchronous CDMA (TD-SCDMA), with 3.9G wireless communication protocol such as evolved-universal terrestrial radio access network (E-UTRAN), with fourth-generation (4G) wireless communication protocols, or the like. As an alternative (or additionally), the device 100 may be capable of operating in accordance with non-cellular communication mechanisms. For example, computer networks such as the Internet, local area network, wide area networks, and the like; short range wireless communication networks such as include Bluetooth® networks, Zigbee® networks, Institute of Electric and Electronic Engineers (IEEE) 802.11x networks, and the like; wireline telecommunication networks such as public switched telephone network (PSTN).

The controller 108 may include circuitry implementing, among others, audio and logic functions of the device 100. For example, the controller 108 may include, but are not limited to, one or more digital signal processor devices, one or more microprocessor devices, one or more processor(s) with accompanying digital signal processor(s), one or more processor(s) without accompanying digital signal processor(s), one or more special-purpose computer chips, one or more field-programmable gate arrays (FPGAs), one or more controllers, one or more application-specific integrated circuits (ASICs), one or more computer(s), various analog to digital converters, digital to analog converters, and/or other support circuits. Control and signal processing functions of the device 100 are allocated between these devices according to their respective capabilities. The controller 108 thus may also include the functionality to convolutionally encode and interleave message and data prior to modulation and transmission. The controller 108 may additionally include an internal voice coder, and may include an internal data modem. Further, the controller 108 may include functionality to operate one or more software programs, which may be stored in a memory. For example, the controller 108 may be capable of operating a connectivity program, such as a conventional Web browser. The connectivity program may then allow the device 100 to transmit and receive Web content, such as location-based content and/or other web page content, according to a Wireless Application Protocol (WAP), Hypertext Transfer Protocol (HTTP) and/or the like. In an example embodiment, the controller 108 may be embodied as a multi-core processor such as a dual or quad core processor. However, any number of processors may be included in the controller 108.

The device 100 may also comprise a user interface including an output device such as a ringer 110, an earphone or speaker 112, a microphone 114, a display 116, and a user input interface, which may be coupled to the controller 108. The user input interface, which allows the device 100 to receive data, may include any of a number of devices allowing the device 100 to receive data, such as a keypad 118, a touch display, a microphone or other input device. In embodiments including the keypad 118, the keypad 118 may include numeric (0-9) and related keys (#, *), and other hard and soft keys used for operating the device 100. Alternatively, the keypad 118 may include a conventional QWERTY keypad arrangement. The keypad 118 may also include various soft keys with associated functions. In addition, or alternatively, the device 100 may include an interface device such as a joystick or other user input interface. The device 100 further includes a battery 120, such as a vibrating battery pack, for powering various circuits that are used to operate the device 100, as well as optionally providing mechanical vibration as a detectable output.

In an example embodiment, the device 100 includes a media capturing element, such as a camera, video and/or audio module, in communication with the controller 108. The media capturing element may be any means for capturing an image, video and/or audio for storage, display or transmission. In an example embodiment in which the media capturing element is a camera module 122, the camera module 122 may include a digital camera capable of forming a digital image file from a captured image. As such, the camera module 122 includes all hardware, such as a lens or other optical component(s), and software necessary for creating a digital image file from a captured image. Alternatively, the camera module 122 may include only the hardware needed to view an image, while a memory device of the device 100 stores instructions for execution by the controller 108 in the form of software to create a digital image file from a captured image. In an example embodiment, the camera module 122 may further include a processing element such as a co-processor, which assists the controller 108 in processing image data and an encoder and/or decoder for compressing and/or decompressing image data. The encoder and/or decoder may encode and/or decode according to a JPEG standard format or another like format. For video, the encoder and/or decoder may employ any of a plurality of standard formats such as, for example, standards associated with H.261, H.262/MPEG-2, H.263, H.264, H.264/MPEG-4, MPEG-4, and the like. In some cases, the camera module 122 may provide live image data to the display 116. Moreover, in an example embodiment, the display 116 may be located on one side of the device 100 and the camera module 122 may include a lens positioned on the opposite side of the device 100 with respect to the display 116 to enable the camera module 122 to capture images on one side of the device 100 and present a view of such images to the user positioned on the other side of the device 100.

The device 100 may further include a user identity module (UIM) 124. The UIM 124 may be a memory device having a processor built in. The UIM 124 may include, for example, a subscriber identity module (SIM), a universal integrated circuit card (UICC), a universal subscriber identity module (USIM), a removable user identity module (R-UIM), or any other smart card. The UIM 124 typically stores information elements related to a mobile subscriber. In addition to the UIM 124, the device 100 may be equipped with memory. For example, the device 100 may include volatile memory 126, such as volatile Random Access Memory (RAM) including a cache area for the temporary storage of data. The device 100 may also include other non-volatile memory 128, which may be embedded and/or may be removable. The non-volatile memory 128 may additionally or alternatively comprise an electrically erasable programmable read only memory (EEPROM), flash memory, hard drive, or the like. The memories may store any number of pieces of information, and data, used by the device 100 to implement the functions of the device 100.

Figure 2:
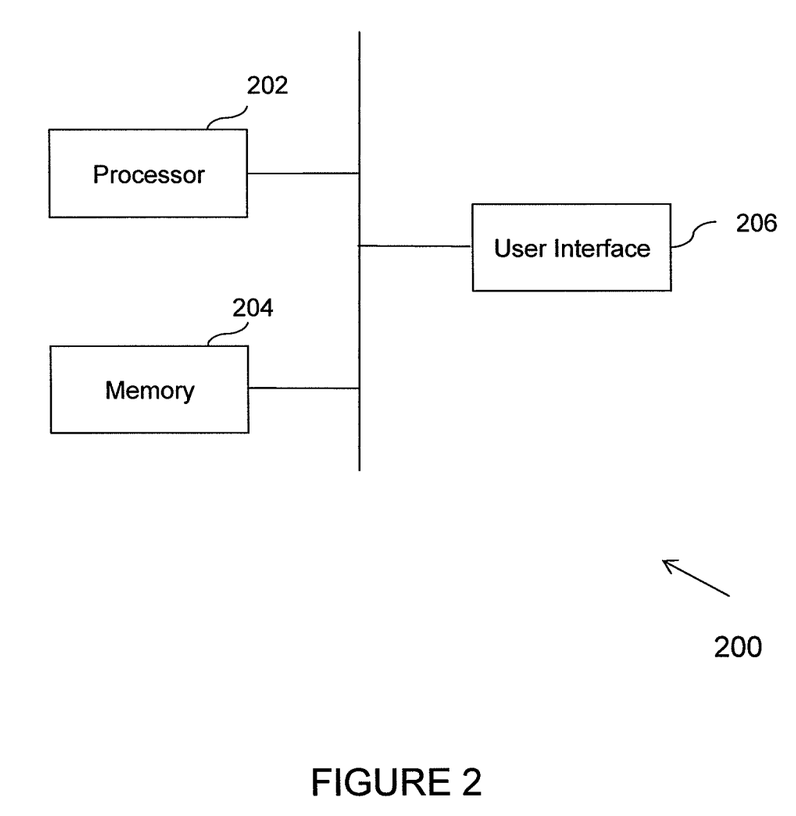
FIG. 2 illustrates an apparatus for generating panorama images in accordance with an example embodiment.

FIG. 2 illustrates an apparatus 200 for generating panorama image in accordance with an example embodiment. The apparatus 200 may be employed, for example, in the device 100 of FIG. 1. However, it should be noted that the apparatus 200, may also be employed on a variety of other devices both mobile and fixed, and therefore, embodiments should not be limited to application on devices such as the device 100 of FIG. 1. In an example embodiment, the apparatus 200 is one of a mobile phone, a personal digital assistant (PDA), and a camera which may be examples of a communication device. Alternatively or additionally, embodiments may be employed on a combination of devices including, for example, those listed above. Accordingly, various embodiments may be embodied wholly at a single device, (for example, the device 100 or in a combination of devices). Furthermore, it should be noted that some devices or elements described below may not be mandatory and thus some may be omitted in certain embodiments.

In an example embodiment, the apparatus 200 includes or otherwise is in communication with at least one processor 202 and at least one memory 204. Examples of the at least one memory 204 include, but are not limited to, volatile and/or non-volatile memories. Some examples of the volatile memory includes, but are not limited to, random access memory, dynamic random access memory, static random access memory, and the like. Some example of the non-volatile memory includes, but are not limited to, hard disks, magnetic tapes, optical disks, programmable read only memory, erasable programmable read only memory, electrically erasable programmable read only memory, flash memory, and the like. The memory 204 may be configured to store information, data, applications, instructions or the like for enabling the apparatus 200 to carry out various functions in accordance with various example embodiments. For example, the memory 204 may be configured to buffer input data for processing by the processor 202. Additionally or alternatively, the memory 204 may be configured to store instructions for execution by the processor 202. In an example embodiment, the memory 204 may be configured to store multimedia content, such as a images, videos and the like.

An example of processor 202 may include the controller 108 of FIG. 1. The processor 202 may be embodied in a number of different ways. The processor 202 may be embodied as a multi-core processor, a single core processor; or combination of multi-core processors and single core processors. For example, the processor 202 may be embodied as one or more of various processing means such as a coprocessor, a microprocessor, a controller, a digital signal processor (DSP), processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an example embodiment, the multi-core processor may be configured to execute instructions stored in the memory 204 or otherwise accessible to the processor 202. Alternatively or additionally, the processor 202 may be configured to execute hard coded functionality. As such, whether configured by hardware or software methods, or by a combination thereof, the processor 202 may represent an entity, for example, physically embodied in circuitry, capable of performing operations according to various embodiments while configured accordingly. For example, if the processor 202 is embodied as two or more of an ASIC, FPGA or the like, the processor 202 may be specifically configured hardware for conducting the operations described herein. Alternatively, as another example, if the processor 202 is embodied as an executor of software instructions, the instructions may specifically configure the processor 202 to perform the algorithms and/or operations described herein when the instructions are executed. However, in some cases, the processor 202 may be a processor of a specific device, for example, a mobile terminal or network device adapted for employing embodiments by further configuration of the processor 202 by instructions for performing the algorithms and/or operations described herein. The processor 202 may include, among other things, a clock, an arithmetic logic unit (ALU) and logic gates configured to support operation of the processor 202.

A user interface 206 may be in communication with the processor 202. Examples of the user interface 206 include but are not limited to, input interface and/or output user interface. The input interface is configured to receive an indication of a user input. The output user interface provides an audible, visual, mechanical or other output and/or feedback to the user. Examples of the input interface may include, but are not limited to, a keyboard, a mouse, a joystick, a keypad, a touch screen, soft keys, and the like. Examples of the output interface may include, but are not limited to, a display such as light emitting diode display, thin-film transistor (TFT) display, liquid crystal displays, active-matrix organic light-emitting diode (AMOLED) display, a microphone, a speaker, ringers, vibrators, and the like. In an example embodiment, the user interface 206 may include, among other devices or elements, any or all of a speaker, a microphone, a display, and a keyboard, touch screen, or the like. In this regard, for example, the processor 202 may comprise user interface circuitry configured to control at least some functions of one or more elements of the user interface 206, such as, for example, a speaker, ringer, microphone, display, and/or the like. The processor 202 and/or user interface circuitry comprising the processor 202 may be configured to control one or more functions of one or more elements of the user interface 206 through computer program instructions, for example, software and/or firmware, stored on a memory, for example, the at least one memory 204, and/or the like, accessible to the processor 202.

In an example embodiment, the apparatus 200 may include a communication device. In an example embodiment, the communication device may include a mobile phone. In an embodiment, the communication device may include a user interface, for example, the UI 206, having user interface circuitry and user interface software configured to facilitate a user to control at least one function of the communication device through use of a display and further configured to respond to user inputs. In an example embodiment, the communication device may include a display circuitry configured to display at least a portion of the user interface of the communication device. The display and display circuitry may be configured to facilitate the user to control at least one function of the communication device.

In an example embodiment, the processor 202 is configured to, with the content of the memory 204, and optionally with other components described herein, to cause the apparatus 200 to generate a panorama image from a sequence of images. The apparatus 200 may receive the sequence of images from internal memory such as hard drive, random access memory (RAM) of the apparatus 200, or from external storage medium such as digital versatile disk (DVD), compact disk (CD), flash drive, memory card, or from external storage locations through the Internet, Bluetooth®, and the like. The apparatus 200 may also receive the images from the memory 204. In an example embodiment, the sequence of images generated may include images immediately after capturing the images. For example, the sequence of images may include an image and at least one subsequent image. The term 'at least one subsequent image' may refer to an image appearing adjacent to the image in the sequence, and/or any image appearing next to the adjacent image in the sequence of images. In an example embodiment, the image and the at least one subsequent image may be the warped images that may be processed by the apparatus for generating the panorama image.

In an example embodiment, the processor 202 operating under software control, or the processor 202 embodied as an ASIC or FPGA specifically configured to perform the operations described herein, or a combination thereof, thereby configures the apparatus or circuitry to receive an image and at least one subsequent image. In an example embodiment, the image and the at least one subsequent image may be received in a storage. In an example embodiment, the storage may be the memory 204 or other means configured to store the sequence of images. In an example embodiment, the storage may be configured to store images temporarily from an instant the images are warped till the instant the images may be processed to generate at least a portion of the panorama image. In an example embodiment, the processor 202 is configured to, with the content of the memory 204, and optionally with other components described herein, to cause the apparatus 200 to remove an image from the storage upon the image being processed for generating at least a portion of the panorama image. As used herein, 'at least a portion of the panorama image' refers to various individual portions of the images that may be obtained by processing individual images constituting a panorama image. For example, upon processing a first image with a second image adjacent to the first image from a sequence of images, the portion of the first image may be obtained that may become a part of the panorama image. Such a processed portion of the first image may be referred to as at least one portion of the panorama image.

In the sequence of images, the image and the at least one subsequent image may include at least one overlapping region. The image and the at least one subsequent images may be referred to as 'adjacent images'. The term 'overlapping region' may refer to a region that is common between the adjacent images. For example, the region near the edges of the adjacent images may be overlapping regions. In an example embodiment, the overlapping region between the adjacent images may be less than 50 percent. For example, an Nth image and an (N+1)th image may overlap such that the images may include only 50 percent or even lesser percentage of a common portion. In another example embodiment, the overlapping region between the adjacent images of the sequence of images may be more than 50 percent. For example, the adjacent images such as (N−1)th, Nth, and (N+1)th image may be such that (N−1)th image may overlap with Nth image as well as with (N+1)th image.

In an example embodiment, the processor 202 is configured to, with the content of the memory 204, and optionally with other components described herein, to cause the apparatus 200 to separate the at least one overlapping region between the adjacent images into a first overlapping region and a second overlapping region. In an example embodiment, the at least one overlapping region between the adjacent images is separated into the first overlapping region and the second overlapping region by configuring a 'seam'. A 'seam' may be referred to as a path produced by difference in intensity of pixels lying in close vicinity of the region where the adjacent images are joined for generating the panorama image.

In an example embodiment, the processor 202 is configured to, with the content of the memory 204, and optionally with other components described herein, to cause the apparatus 200 to perform blending of a substantial portion of the second overlapping region with a substantial portion of a non-overlapping region of the at least one subsequent image for reducing any appearance of the seam in the at least one overlapping region. In an example embodiment, blending of the substantial portion of the second overlapping region with the substantial portion of the non-overlapping region of the at least one subsequent image may be performed by blending the pixels in the second overlapping region with the pixels in the subsequent image. Various blending techniques, for example, mean value correction (MVC) blending, Poisson blending, and the like may be employed for blending the pixels in the second overlapping region with the pixels in the at least one subsequent image. As used herein, the term 'substantial portion' of the second overlapping region may refer to a majority of portion of the second overlapping region. In an example embodiment, the 'substantial portion' of the second overlapping region may include more than half (fifty percent) of the second overlapping region. Also, the term 'substantial portion' of the non-overlapping region of the at least one subsequent image include more than fifty percent of the non-overlapping region of the at least one subsequent image.

In an example embodiment, the processor 202 is configured to, with the content of the memory 204, and optionally with other components described herein, to cause the apparatus 200 to modify the substantial portion of the second overlapping region in the image based on the blended substantial portion of the second overlapping region in the at least one subsequent image. In an example embodiment, the substantial portion of the second overlapping region in the image is modified by replicating the blended pixels of the substantial portion of the second overlapping region onto the overlapping region of the image.

In an example embodiment, the processor 202 is configured to, with the content of the memory 204, and optionally with other components described herein, to cause the apparatus 200 to generate at least a portion, for example, a first portion of the panorama image by combining the modified substantial portion of the second overlapping region of the image with a substantial portion of non-overlapping region of the image. In an example embodiment, the processor 202 is configured to, with the content of the memory 204, and optionally with other components described herein, to cause the apparatus 200 to store the first portion of the panorama image. In an example embodiment, the processor 202 is configured to, with the content of the memory 204, and optionally with other components described herein, to cause the apparatus 200 to remove the modified substantial portion of the second overlapping region of the image and the substantial portion of the non-overlapping region of the image from the storage upon generation of the first portion of the panorama image.

A second portion of the panorama image may generated by extracting a substantial portion of the non-overlapping portion of the at least one subsequent image. In an example embodiment, the processor 202 is configured to, with the content of the memory 204, and optionally with other components described herein, to cause the apparatus 200 to store the second portion of the panorama image. In an example embodiment, the processor 202 is configured to, with the content of the memory 204, and optionally with other components described herein, to cause the apparatus 200 to remove the substantial portion of the non-overlapping region of the at least one subsequent image from the storage upon generation of the second portion of the panorama image.

In an example embodiment, the processor 202 is configured to, with the content of the memory 204, and optionally with other components described herein, to cause the apparatus 200 to encode the first portion to generate a first encoded portion of the panorama image. In another embodiment, the processor 202 is configured to, with the content of the memory 204, and optionally with other components described herein, to cause the apparatus 200 to rotate the first portion of the panorama image by an odd multiple of 90 degrees upon generating the first portion of the panorama image. In an example embodiment, the rotated first portion of the panorama image may be encoded with appropriate orientation information in the header of an image file, such as an exchange image file format (Exif) file to form the final panorama image.

In an example embodiment, the processor 202 is configured to, with the content of the memory 204, and optionally with other components described herein, to cause the apparatus 200 to encode the second portion to generate a second encoded portion of the panorama image. In an example embodiment, the second encoded portion may be processed and re-encoded to form a final panorama image. In an example embodiment, the processor 202 is configured to, with the content of the memory 204, and optionally with other components described herein, to cause the apparatus 200 to rotate the second portion of the panorama image by an odd multiple of 90 degrees upon generating the second portion of the panorama image. In an example embodiment, the rotated second portion of the panorama image may later be stream encoded with appropriate orientation information in the header of an image file, for example, an Exif file to form the final panorama image.

Figure 3:
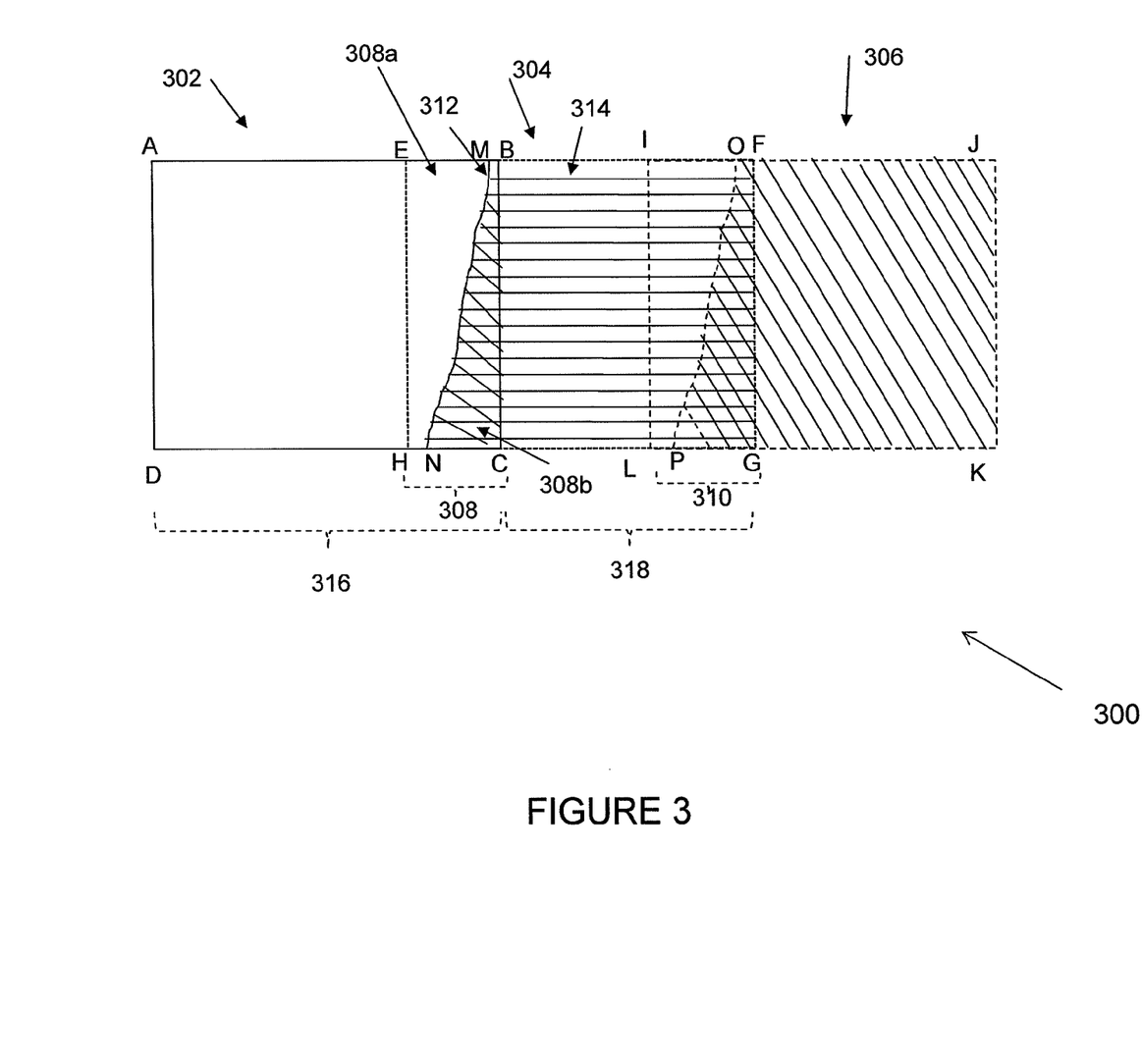
FIG. 3 illustrates an example sequence of images for generating a panorama image, in accordance with an example embodiment.

The generation of a panorama image may be explained by considering two cases of varying percentage of overlapping regions between the adjacent images. FIG. 3 describe the case if an overlap between the adjacent images is less than 50 percent, and FIGS. 4a and 4b describe the case, if the overlap between the adjacent images is more than 50 percent.

FIG. 3 illustrates an example sequence of images 300 for generating a panorama image, in accordance with an example embodiment. The example sequence of images 300 includes an image 302 (within area ABCD), an image 304 (within area EFGH), and an image 306 (within area IJKL). In the present embodiment, an overlapping between the adjacent images is less than 50 percent.

As an example, the overlapping between the image 302 and the image 304 is about 30 percent. As another example, the overlapping between the image 304 and the image 306 is about 30 percent. The overlapping region between the image 302 and the image 304 is represented by an area enclosed by EBCH (marked as 308), and between the image 304 and the image 306 by an area enclosed by IFGL (marked as 310) in FIG. 3.

If the overlap between the neighboring images is less than 50 percent, the images overlap with a subsequent image only. For example, an Nth image may overlap with (N+1)th image only, in case the overlap between the two images is less than 50 percent. Accordingly, in FIG. 3, the image 302 is shown to be overlapping with the image 304 only, and the image 304 is shown to overlap with the image 306.

In an example embodiment, the images for example the images 302, 304 and 306 may be received immediately after the capture of the images 302, 304 and 306. In an example embodiment, the images for example the images 302, 304 and 306 may be captured by an image capturing device, such as a camera. In an example embodiment, the images for example the images 302, 304 and 306 may be received in a storage. In an example embodiment, the storage may be any means that is capable of temporarily or permanently storing images, for example, the memory 204.

In an example embodiment, various processes may be performed on each image of the sequence of images before being utilized for generating a panorama image. For example, the images may be registered and warped. Warping is a process of digitally modifying an image for correcting image distortion. In an example embodiment, the warping of the images may be performed to correct an inherent radial distortion of the camera, and to convert from the camera's planar projection to the cylindrical projection of the panorama image. In an example embodiment, the images such as the images 302, 304 and 306 are warped images.

In an example embodiment, a color correction may be performed on the individual warped images. Also, labeling is performed in the overlapping regions between the adjacent images. After labeling, blending of the adjacent images may be performed for combining the images to generate a part of the panorama image. Blending is performed by blending the overlapping regions of the adjacent images to generate the panorama image. Various blending techniques, for example, MVC blending, Poisson blending, and the like may be employed for blending the adjacent images.

Referring to FIG. 3, the image 302, the image 304, and the image 306 are shown to include overlapping region 308 (within area EBCH) and overlapping region 310 (within area IFGL). The process of generating the panorama image may be explained by considering the image 302, the image 304 substantially overlapping with each other, thereby configuring the overlapping region 308. It will be understood that the process of generating a portion of the panorama image from the image 304, and the image 306 is the same as for the image 302, and the image 304.

The overlapping region 308 may be separated into two different parts, namely, a first overlapping region 308a (within area EMNH) and a second overlapping region 308b (within area MBCN). In an example embodiment, the overlapping region may include a seam, for example a seam 312 (represented as MN) generated after labeling operation that may separate the overlapping region into a first overlapping region and a second overlapping region. In an example embodiment, the first overlapping region 308a is the region appearing before the seam 312 and the second overlapping region 308b is the region appearing after the seam 312. In an example embodiment, the seam 312 in the overlapping region 308 may be determined by using various techniques, such as a dynamic programming method, graph cut, and the like.

In an example embodiment, the panorama image may be generated by storing multiple encoded images in a buffer associated with the panorama image. The buffer associated with the panorama image may be referred to as a 'panorama image buffer'. The multiple encoded images may be obtained in multiple steps by encoding the sequence of images, and storing each portion of the panorama generated in every step in the panorama image buffer. The panorama image buffer may store the portions of the panorama image and may display the final panorama image by concatenating the stored portions of the panorama image.

In an example embodiment, a substantial portion of the second overlapping region 308b in the image 304 is blended with a substantial portion of a non-overlapping region 314 (within area BFGC) of the image 304, and combined with the substantial portion of non-overlapping region of the image 302 to generate the first portion of the panorama image. In an example embodiment, the blending of the second overlapping region 308b with the non-overlapping region 314 of the second image 304 may include blending a plurality of pixels of the second overlapping region 308b with a plurality of pixels of the non-overlapping region 314 after the seam 312 in the second image 304. The image 302 including the first overlapping region 308a (before the seam 312) and the modified second overlapping region 308b may be stored directly as a first portion 316 of the panorama image. In an example embodiment, the substantial portion of the second overlapping region and the substantial portion of the non-overlapping region of the image 302 may be removed from the storage upon storing the first portion of the panorama image. The second portion 318 of the panorama image (or the second encoded buffer 318, within area enclosed by FGCB) may start with an offset in the second image 304 and end at the end of the blended image 304. In an example embodiment, the second encoded buffer 318 may be stored as the second portion of the panorama image. In an example embodiment, the image 304 may be removed from the storage upon storing the second portion of the panorama image.

Figure 4A:
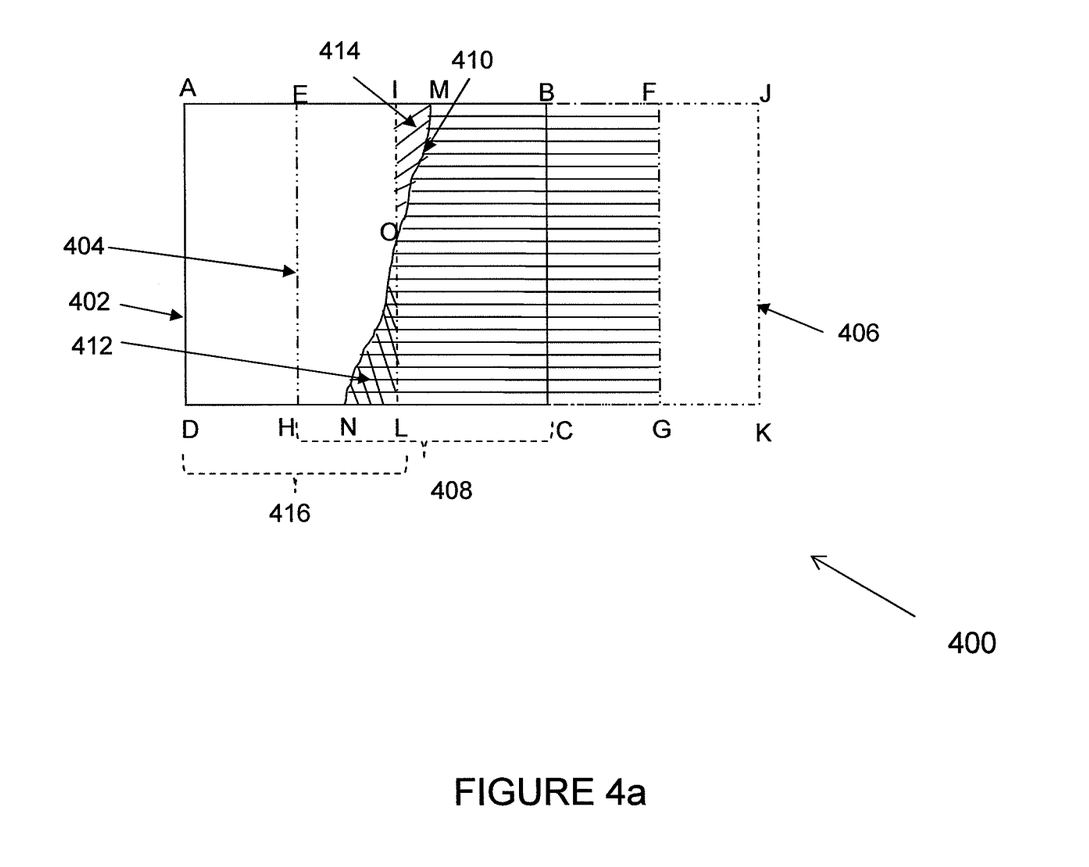
FIGS. 4a and 4b illustrate an example sequence of images for generating a panorama image, in accordance with another example embodiment.

FIG. 4a illustrates an example sequence of images for generating a panorama image, in accordance with another example embodiment. The example sequence of images 400 includes adjacent images for example, an image 402 (within area ABCD), an image 404 (within area EFGH), and an image 406 (within area enclosed by IJKL). In the present embodiment, the overlapping between the adjacent images is considered to be more than 50 percent. For example, the overlapping between the image 402, the image 404 and the image 406 is considered to be about 70 percent, and the image 402 is shown to overlap with the image 404 and the image 406. The overlapping region between the image 402 and the image 404 is shown as region 408 (within area BCHE). In an example embodiment, a seam for example a seam 410 (represented by MON) may be determined in the overlapping region 408 for separating the overlapping region 408 into a first overlapping region (within area EMONH) and a second overlapping region (within area MBCLN). The first overlapping region may be the overlapping region appearing before the seam 410, and the second overlapping region may be the overlapping region after the seam 410.

In the overlapping region (within area enclosed by EBCH) the portion before the seam 410 (area 414, which is the area enclosed by IOM) is copied from a buffer associated with the image 402 to a buffer associated with the image 404, and the portion after the seam 410 (which is the area enclosed by ONL) is modified and written into the buffer associated with the image 402 based on the pixels of the image 404. In an example embodiment, the portion 412 is modified by blending a plurality of pixels of the portion 412 in the subsequent image 404 with the plurality of pixels of the non-overlapping region of the image 404, and then modifying the portion 412 in the image 402. The portion 412 is modified in the image 402, and along with a portion 416 (within area AILD) may be stored as a first portion of the panorama image. The first portion (within area AILD) of the panorama image may begin with a starting edge of the image 402 and extend till the start of the image 406. In an example embodiment, after the first portion is stored to the panorama image, the first image 402 is removed from the storage.

In an example embodiment, the first portion of the panorama image may be rotated by 90 degrees (or odd multiple of 90 degree) and stream encoded as a jpeg file with orientation information in the header of exif file. In another embodiment, the first portion and subsequent portions of the panorama image may be separately encoded as independent images, and thereafter combined to form a final panorama image for display.

Since, after storing the first portion in the panorama image, the image 402 may be removed from the storage, therefore, the region 414 may be replicated to the subsequent image 404 for further processing. Accordingly, a plurality of pixels associated with the region 414 above the end position of the first portion 416 but before the start of seam 410 (pixels associated with the region MOI) have to be replicated from the image 402 to the subsequent image 404.

Figure 4B:
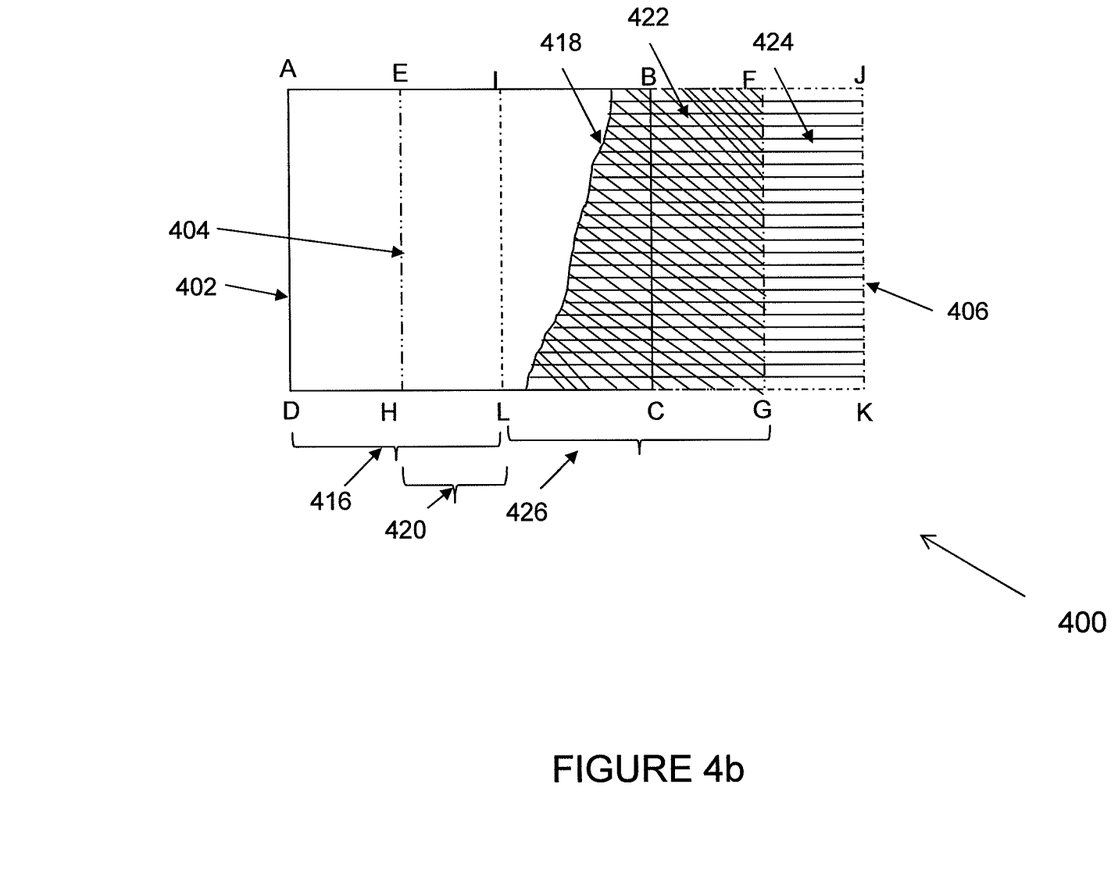

After, the first portion 416 is stored in the panorama image buffer, a second portion may be generated for storing in the panorama image buffer. The second portion may be generated in a manner similar to the first portion 416. Referring to FIG. 4b, a seam 418 may be determined in overlapping portion between the image 404 and the image 406 (till the extension of the image 402). The second portion of the panorama image may start after an offset 420 in the image 404 and may end at an end of the image 404. For generating the second portion of the panorama image, a plurality of pixels in the image 404 that are after the seam 418 have to be taken from image 406, and a plurality of pixels before the seam 418 have to be taken from the image 404. Accordingly, the pixels associated with the region 422 of the image 404 may be blended with the pixels of the image 406 until an end of the image 404 in the image 404 only. The blending in the region 424 may be done in the image 406 only.

A third portion 424 (within area JKGF) of the panorama image may be taken from the image 406. The third portion 424 of the panorama image may begin with an offset 426 (as shown in the FIG. 4b) in the image 406 and ends at an end of the image 406.

Figure 5:
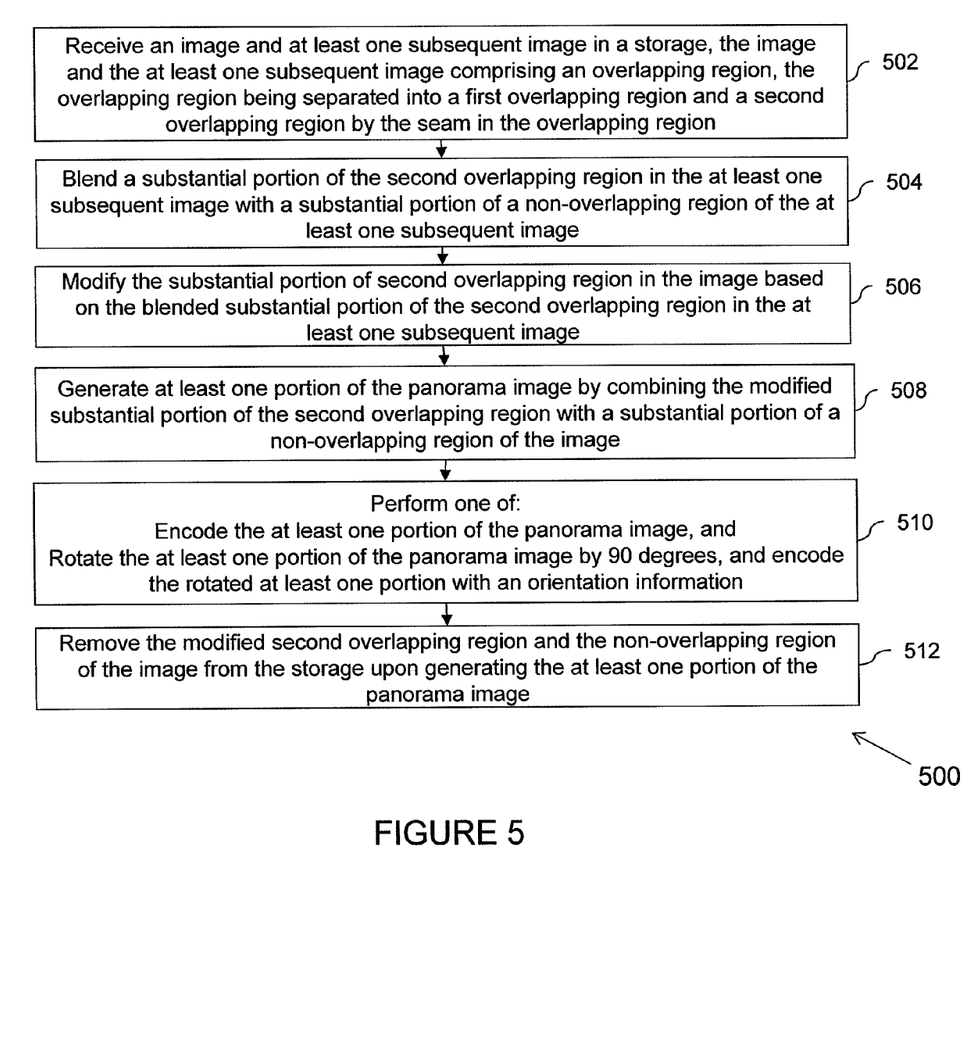
FIG. 5 is a flowchart depicting an example method for generating a panorama image in accordance with an example embodiment.

FIG. 5 is a flowchart depicting an example method 500 for generating a panorama image in accordance with an example embodiment. The method 500 depicted in the flow chart may be executed by an apparatus, for example, the apparatus 200 of FIG. 2. In an example embodiment, the apparatus 200 is a multimedia device. In an example embodiment, the multimedia device is one of a mobile phone, and a personal digital assistant (PDA). In an example embodiment, the multimedia device includes a media capturing device. In an example embodiment, the media capturing device is a camera.

Operations of the flowchart, and combinations of operation in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of an apparatus and executed by at least one processor in the apparatus. Any such computer program instructions may be loaded onto a computer or other programmable apparatus (for example, hardware) to produce a machine, such that the resulting computer or other programmable apparatus embody means for implementing the operations specified in the flowchart. These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the operations specified in the flowchart. The computer program instructions may also be loaded onto a computer or other programmable apparatus to cause a series of operations to be performed on the computer or other programmable apparatus to produce a computer-implemented process such that the instructions, which execute on the computer or other programmable apparatus provide operations for implementing the operations in the flowchart. The operations of the method 500 are described with help of apparatus 200. However, the operations of the method 500 can be described and/or practiced by using any other apparatus.

At block 502, an image and at least one subsequent image may be received in a storage. In an example embodiment, the image and the at least one subsequent image include at least one overlapping region. The at least one overlapping region is separated into a first overlapping region and a second overlapping region. In an example embodiment, the overlapping region is separated into the first overlapping region and the second overlapping region by a seam. In an example embodiment, the first overlapping region is the overlapping region before the seam, and the second overlapping region is the overlapping region appearing after the seam.

At block 504, a substantial portion of the second overlapping region in the subsequent image is blended with a substantial portion of a non-overlapping region of the at least one subsequent image. In an example embodiment, the blending of the substantial portion of the second overlapping region with the substantial portion of the non-overlapping region of the at least one subsequent image includes blending of the plurality of pixels corresponding to the substantial portion of second overlapping region with the pixels of the substantial portion of the non-overlapping region after the seam in the second image. At block 506, the substantial portion of the second overlapping region in the image is modified based on the blended substantial portion of the second overlapping region in the at least one subsequent image. In an example embodiment, modifying includes overwriting a plurality of pixels associated with the substantial portion of second overlapping region in the image with a plurality of pixels associated with the substantial portion of the blended second overlapping region in the at least one subsequent image.

At block 508, a portion of a panorama image is generated by combining the modified substantial portion of the second overlapping region with the substantial portion of the non-overlapping region of the image. At block 510, the at least one portion of the panorama image may be encoded. In another example embodiment, the at least one portion of the panorama image is rotated by 90 degrees (or odd multiples of 90). The rotated at least one portion of the panorama image may be stream encoded with an orientation information in a header of an exif file so that the at least on portion may later be concatenated with other portions (rotated by 90 degrees) of the panorama image. At block 512, the modified substantial portion of the second overlapping region and the substantial portion of the non-overlapping region of the image are removed from the storage upon generating the portion of the panorama image. In an example embodiment, "removing a portion of the image from the storage" may refer to permanently discarding the image. An advantage of discarding the image/portion of the image is saving of a storage space achieved in the apparatus such as the apparatus 200.

In an example embodiment, at least one subsequent portion of the panorama image is generated. In an example embodiment, the at least one subsequent portion of the panorama image is the blended with the non-overlapping region of the at least one subsequent image. In an example embodiment, the second portion may be stored to a panorama image buffer. Upon storing the second portion to the panorama image buffer, the blended non-overlapping region of the subsequent image may be removed from the storage.

In an example embodiment, the at least one subsequent portion of the panorama image may be encoded. In an example embodiment, each portion of the panorama image may be encoded separately, and upon being processed, may be re-encoded to form the panorama image. In another example embodiment, each portion of the panorama image may be rotated by 90 degree, and stream encoded with appropriate orientation information in the exif header to form a final panorama image. It will be understood that although the method 500 of FIG. 5 shows a particular order, the order need not be limited to the order shown, and more or fewer blocks may be executed, without providing substantial change to the scope of the present disclosure.

Without in any way limiting the scope, interpretation, or application of the claims appearing below, a technical effect of one or more of the example embodiments disclosed herein is to generate a panorama image. Upon receiving captured images, an overlapping portion between adjacent images is determined and then processed. The images are blended so as to minimize any transition effects between the images. Each image is processed and appended to a panorama image in a panorama image buffer so that only the final panorama image is displayed. Once the processed image is saved as a portion of the panorama image, the processed image is removed permanently from the storage. Accordingly, a need to store the individual processed/captured images after they are processed is precluded. As such, the memory requirement for storing the panorama images drops down drastically, and hence a panorama generation of many images is possible on limited memory devices, such as mobile devices. The disclosed approach optimizes the memory usage in such devices.

Various embodiments described above may be implemented in software, hardware, application logic or a combination of software, hardware and application logic. The software, application logic and/or hardware may reside on at least one memory, at least one processor, an apparatus or, a computer program product. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of an apparatus described and depicted in FIGS. 1 and/or 2. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the embodiments are set out in the independent claims, other aspects comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present disclosure as defined in the appended claims.

What is claimed is:

1. A method comprising: receiving an image and at least one subsequent image in a storage, the image and the at least one subsequent image comprising at least one overlapping region, the at least one overlapping region being separated into a first overlapping region and a second overlapping region by a seam, wherein the seam is a path produced by difference in intensity of pixels in close vicinity of the region where the overlapping regions are joined;
    blending a substantial portion of the second overlapping region of the at least one subsequent image with a substantial portion of a non-overlapping region of the at least one subsequent image, wherein the blending occurs after the seam of the at least one subsequent image;
    modifying the substantial portion of the second overlapping region of the image based on the blended second overlapping region of the at least one subsequent image;
    wherein in an instance in which the overlapping region is less than or equal to 50 percent of the image or at least one subsequent image, the method further comprises;
    generating a portion of a panorama image by combining the modified substantial portion of the second overlapping region of the image with a substantial portion of a non-overlapping region of the image, wherein the substantial portion of the second overlapping area comprises a region between the seam and the end of the image; and
    generating at least one subsequent portion of a panorama image by extracting the non-overlapping region of the at least one subsequent image, wherein the subsequent portion of the panorama image starts with an offset in the subsequent image and ends with the end of the subsequent image.

2. The method of claim 1 further comprising:
    encoding the at least one portion of the panorama image prior to removing the modified substantial portion of the second overlapping region and the substantial portion of the non-overlapping region of the image; and
    removing the modified substantial portion of the second overlapping region and the substantial portion of the non-overlapping region of the image from the storage upon generating the at least one portion of the panorama image.

3. The method of claim 2 further comprising:
    encoding the at least one subsequent portion of the panorama image; and
    removing the blended substantial portion of the non-overlapping region of the at least one subsequent image from the storage.

4. The method of claim 3 further comprising combining the encoded at least one portion and the at least one subsequent portion of the panorama image.

5. The method of claim 1 further comprising prior to removing the modified substantial portion of the second overlapping region and the substantial portion of the non-overlapping region of the image:
    rotating the at least one portion of the panorama image by an odd multiple of 90 degrees; and
    encoding the rotated at least one portion with an orientation information.

6. The method of claim 1, wherein modifying the substantial portion of the second overlapping region comprises replacing a plurality of pixels associated with the substantial portion of the second overlapping region in the image with a plurality of pixels associated with the blended substantial portion of the second overlapping region in the at least one subsequent image.

7. An apparatus comprising:
    at least one processor; and at least one memory comprising computer program code, the at least one memory and the computer program code configured to, with the at least one processor, cause the apparatus at least to perform:
    receiving an image and at least one subsequent image in a storage, the image and the at least one subsequent image comprising at least one overlapping region, the at least one overlapping region being separated into a first overlapping region and a second overlapping region by a seam, wherein the seam is a path produced by difference in intensity of pixels in close vicinity of the region where the overlapping regions are joined;
    blending a substantial portion of the second overlapping region of the at least one subsequent image with a substantial portion of a non-overlapping region of the at least one subsequent image;
    modifying the substantial portion of the second overlapping region of the image based on the blended second overlapping region of the at least one subsequent image;
    wherein in an instance in which the overlapping region is less than or equal to 50 percent of the image or at least one subsequent image, the method further comprises;
    generating a portion of a panorama image by combining the modified substantial portion of the second overlapping region of the image with a substantial portion of a non-overlapping region of the image, wherein the substantial portion of the second overlapping area comprises a region between the seam and the end of the image; and
    generating at least one subsequent portion of a panorama image by extracting the non-overlapping region of the at least one subsequent image, wherein the subsequent portion of the panorama image starts with an offset in the subsequent image and ends with the end of the subsequent image.

8. The apparatus of claim 7, wherein the apparatus is further caused, at least in part, to perform:
    encoding the at least one portion of the panorama image prior to removing the modified substantial portion of the second overlapping region and the substantial portion of the non-overlapping region of the image; and removing the modified substantial portion of the second overlapping region and the substantial portion of the non-overlapping region of the image from the storage upon generating the at least one portion of the panorama image.

9. The apparatus of claim 8, wherein the apparatus is further caused, at least in part, to perform:
encoding the at least one subsequent portion of the panorama image; and
removing the blended substantial portion of the non-overlapping region of the at least one subsequent image from the storage.

10. The apparatus of claim 9 wherein the apparatus is further caused, at least in part, to perform:
combining the encoded at least one portion and the at least one subsequent portion of the panorama image.

11. The apparatus of claim 7, wherein the apparatus is further caused, at least in part, to perform prior to removing the modified substantial portion of the second overlapping region and the substantial portion of the non-overlapping region of the image:
rotating the at least one portion of the panorama image by an odd multiple of 90 degrees; and
encoding the rotated at least one portion with an orientation information.

12. The apparatus of claim 7, wherein the apparatus is further caused, at least in part, to perform:
modifying the substantial portion of the second overlapping region by replacing a plurality of pixels associated with the substantial portion of the second overlapping region in the image with a plurality of pixels associated with the blended substantial portion of the second overlapping region in the at least one subsequent image.

13. An apparatus of claim 7, wherein the apparatus further comprises a communication device comprising:
a user interface circuitry and user interface software configured to facilitate a user to control at least one function of the communication device through use of a display and further configured to respond to user inputs; and
a display circuitry configured to display at least a portion of a user interface of the communication device, the display and display circuitry configured to facilitate the user to control at least one function of the communication device.

14. The apparatus of claim 13, wherein the apparatus comprises one of a mobile device, a camera and a PDA.

15. A computer program product comprising at least one non-transitory computer-readable storage medium, the computer-readable storage medium comprising a set of instructions, which, when executed by one or more processors, cause an apparatus to at least perform:
receiving an image and at least one subsequent image in a storage, the image and the at least one subsequent image comprising at least one overlapping region, the at least one overlapping region being separated into a first overlapping region and a second overlapping region by a seam, wherein the seam is a path produced by difference in intensity of pixels in close vicinity of the region where the overlapping regions are joined;
blending a substantial portion of the second overlapping region of the at least one subsequent image with a substantial portion of a non-overlapping region of the at least one subsequent image;
modifying the substantial portion of the second overlapping region of the image based on the blended second overlapping region of the at least one subsequent image;
wherein in an instance in which the overlapping region is less than or equal to 50 percent of the image or at least one subsequent image, the method further comprises;
generating a portion of a panorama image by combining the modified substantial portion of the second overlapping region of the image with a substantial portion of a non-overlapping region of the image, wherein the substantial portion of the second overlapping area comprises a region between the seam and the end of the image; and
generating at least one subsequent portion of a panorama image by extracting the non-overlapping region of the at least one subsequent image, wherein the subsequent portion of the panorama image starts with an offset in the subsequent image and ends with the end of the subsequent image.

16. The computer program product of claim 15, wherein the apparatus is further caused, at least in part, to perform:
encoding the at least one portion of the panorama image prior to removing the modified substantial portion of the second overlapping region and the substantial portion of the non-overlapping region of the image: and
removing the modified substantial portion of the second overlapping region and the substantial portion of the non-overlapping region of the image from the storage upon generating the at least one portion of the panorama image.

17. The computer program product of claim 16, wherein the apparatus is further caused, at least in part, to perform:
encoding the at least one subsequent portion of the panorama image; and
removing the blended substantial portion of the non-overlapping region of the at least one subsequent image from the storage.

18. The computer program product of claim 17 wherein the apparatus is further caused, at least in part, to perform:
combining the encoded at least one portion and the at least one subsequent portion of the panorama image.

19. The computer program product of claim 15, wherein the apparatus is further caused, at least in part, to perform prior to removing the modified substantial portion of the second overlapping region and the substantial portion of the non-overlapping region of the image:
rotating the at least one portion of the panorama image by an odd multiple of 90 degrees; and
encoding the rotated at least one portion with an orientation information.

20. The computer program product of claim 15, wherein the apparatus is further caused, at least in part, to perform:
modifying the substantial portion of the second overlapping region by replacing a plurality of pixels associated with the substantial portion of the second overlapping region in the image with a plurality of pixels associated with the substantial portion of the blended second overlapping region in the at least one subsequent image.

21. The method of claim 1, wherein in an instance in which the overlapping region is greater than 50 percent of the image and at least one subsequent image, the method further comprises:
generating a portion of the panorama image by combining the modified substantial portion of the second overlapping region of the image with a substantial portion of a non-overlapping region of the image, wherein the substantial portion of the second overlapping regions comprises a region between the seam and a subsequent image; and generating at least one subsequent portion of a panorama image by copying a portion of the first overlapping region which further comprises a second subsequent image to the subsequent image and combining the modified substantial portion of the second overlapping region of the at least one subsequent image with a substantial portion of a non-overlapping region of the at least one subsequent image, wherein the at least one subsequent portion of the panorama image starts with an offset in the subsequent image and ends at the end of the subsequent image.

22. The apparatus of claim 7, wherein in an instance in which the overlapping region is greater than 50 percent of the image and at least one subsequent image, wherein the apparatus is further caused, at least in part, to perform:

generating a portion of the panorama image by combining the modified substantial portion of the second overlapping region of the image with a substantial portion of a non-overlapping region of the image, wherein the substantial portion of the second overlapping regions comprises a region between the seam and a subsequent image; and generating at least one subsequent portion of a panorama image by copying a portion of the first overlapping region which further comprises a second subsequent image to the subsequent image and combining the modified substantial portion of the second overlapping region of the at least one subsequent image with a substantial portion of a non-overlapping region of the at least one subsequent image, wherein the at least one subsequent portion of the panorama image starts with an offset in the subsequent image and ends at the end of the subsequent image.

23. The computer program product of claim 15, wherein in an instance in which the overlapping region is greater than 50 percent of the image and at least one subsequent image, wherein the apparatus is further caused, at least in part, to perform:

generating a portion of the panorama image by combining the modified substantial portion of the second overlapping region of the image with a substantial portion of a non-overlapping region of the image, wherein the substantial portion of the second overlapping regions comprises a region between the seam and a subsequent image; and generating at least one subsequent portion of a panorama image by copying a portion of the first overlapping region which further comprises a second subsequent image to the subsequent image and combining the modified substantial portion of the second overlapping region of the at least one subsequent image with a substantial portion of a non-overlapping region of the at least one subsequent image, wherein the at least one subsequent portion of the panorama image starts with an offset in the subsequent image and ends at the end of the subsequent image.

\* \* \* \* \*